(12) United States Patent
Striegel et al.

(10) Patent No.: US 11,396,119 B2
(45) Date of Patent: Jul. 26, 2022

(54) METHOD AND INJECTION MOLDING MANIFOLD ADAPTED FOR LEAK DETECTION DURING INJECTION MOLDING

(71) Applicant: Incoe Corporation, Auburn Hills, MI (US)

(72) Inventors: Christian Striegel, Hessen (DE); Scott Greb, Washington Township, MI (US); Anton Joerg, Bayern (DE)

(73) Assignee: Incoe Corporation, Auburn Hills, MI (US)

( * ) Notice: Subject to any disclaimer, the term of this patent is extended or adjusted under 35 U.S.C. 154(b) by 225 days.

(21) Appl. No.: 16/802,874

(22) Filed: Feb. 27, 2020

(65) Prior Publication Data

US 2021/0268706 A1   Sep. 2, 2021

(51) Int. Cl.
*B29C 45/76*   (2006.01)
*B29C 45/78*   (2006.01)

(52) U.S. Cl.
CPC ........ *B29C 45/7613* (2013.01); *B29C 45/768* (2013.01); *B29C 45/78* (2013.01); *B29C 2945/7604* (2013.01); *B29C 2945/7628* (2013.01); *B29C 2945/76381* (2013.01); *B29C 2945/76454* (2013.01)

(58) Field of Classification Search
CPC ... B29C 45/7613; B29C 45/768; B29C 45/78; B29C 2945/7604; B29C 2945/7628; B29C 2945/76381; B29C 2945/76454
USPC ........................................................ 425/136
See application file for complete search history.

(56) References Cited

U.S. PATENT DOCUMENTS

| | | | | |
|---|---|---|---|---|
| 2,490,817 A | * | 12/1949 | Gilberto | G01K 7/04 136/233 |
| 4,161,386 A | * | 7/1979 | Osuna-Diaz | B29C 45/30 239/133 |
| 4,921,416 A | * | 5/1990 | Green | B29C 45/17 264/40.6 |
| 5,542,835 A | | 8/1996 | Kennedy et al. | |
| 2021/0046685 A1 | * | 2/2021 | Kennedy | G01M 3/26 |

FOREIGN PATENT DOCUMENTS

| | | | | |
|---|---|---|---|---|
| JP | 08066939 A | * | 3/1996 | B29C 45/17 |
| JP | 08066939 A | | 3/1996 | |
| JP | 2001038772 | * | 2/2001 | B29C 45/17 |
| JP | 2011020336 | | 2/2011 | |

OTHER PUBLICATIONS

Search Report and Written Opinion, dated Jun. 15, 2021, 10 pages.

* cited by examiner

*Primary Examiner* — Matthew J Daniels
*Assistant Examiner* — Gregory C. Grosso
(74) *Attorney, Agent, or Firm* — Gunther Evanina; Butzel Long, PC

(57) ABSTRACT

An injection molding hot runner system adapted for leak detection during injection molding includes a manifold and a housing surrounding the manifold, wherein the manifold and the housing are spaced apart defining one or more pockets, the manifold comprises at least one junction point establishing a connection to a component attached to the manifold, wherein at the at least one junction point a sensor is located in the pocket, wherein the sensor is configured to indicate a leak when getting in contact with the molten plastic due to a leak at the junction point.

21 Claims, 18 Drawing Sheets

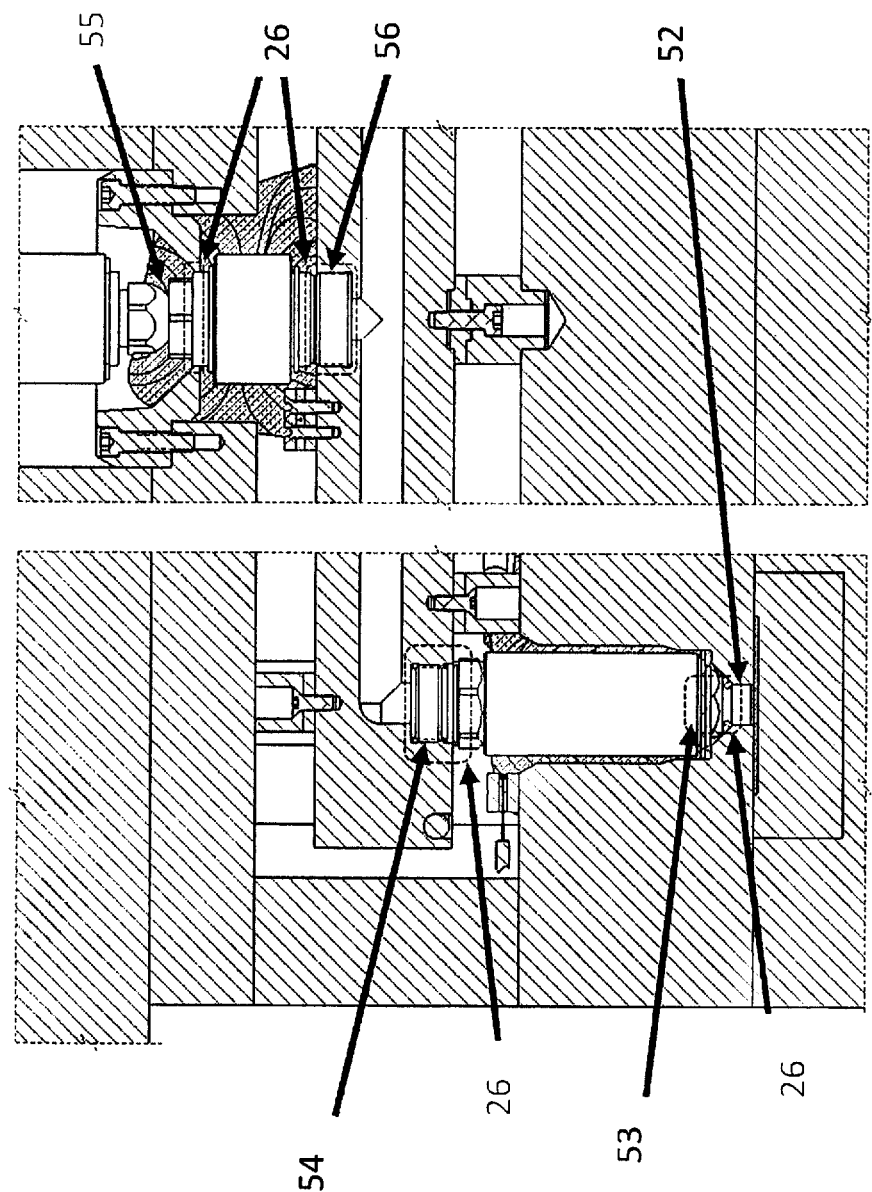

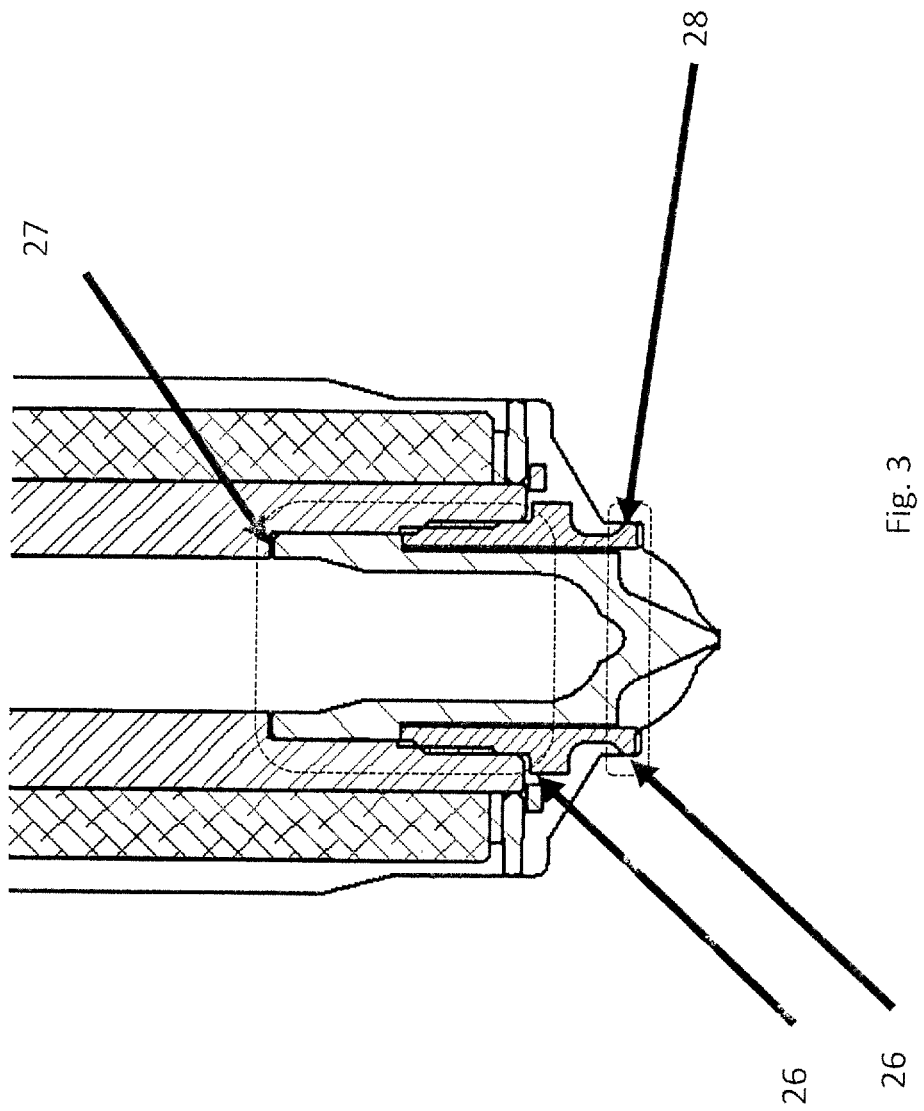

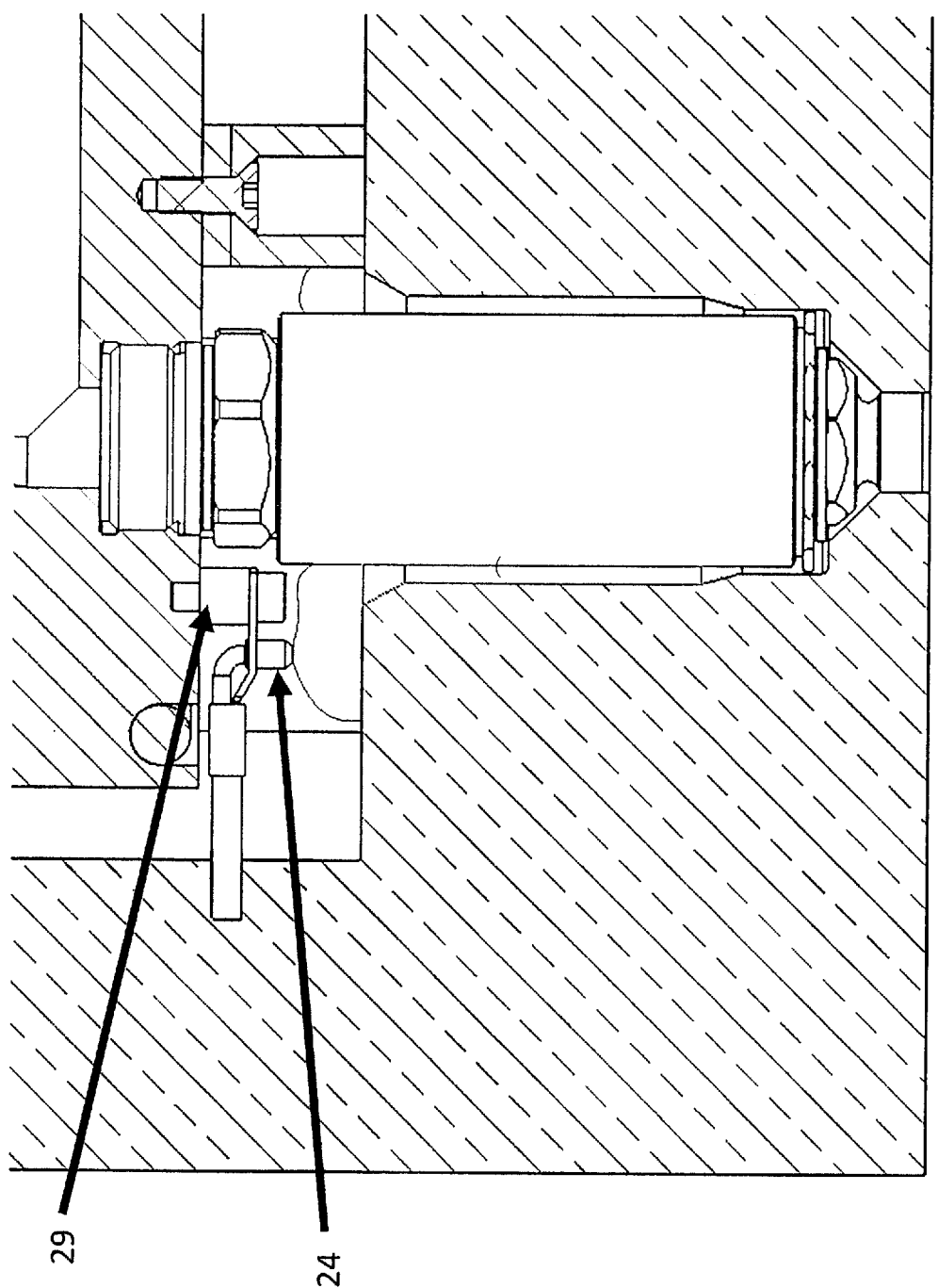

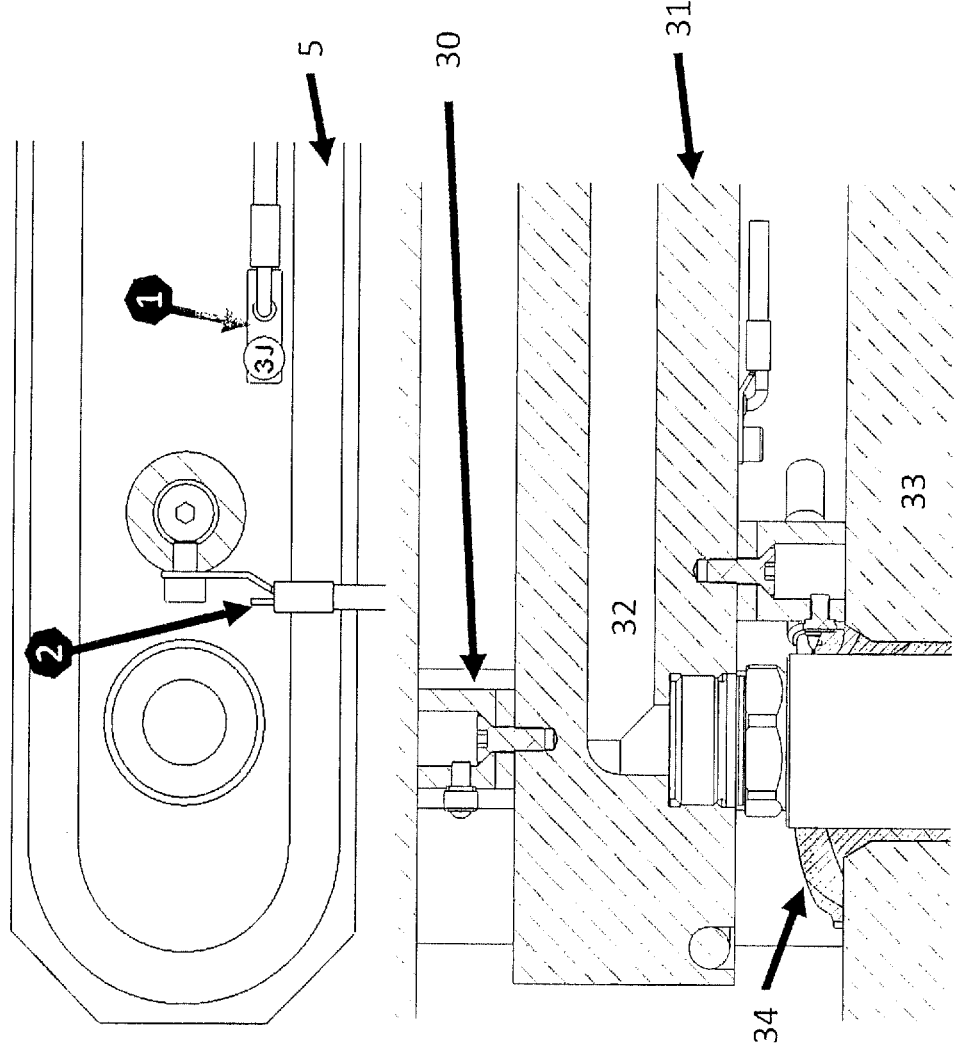

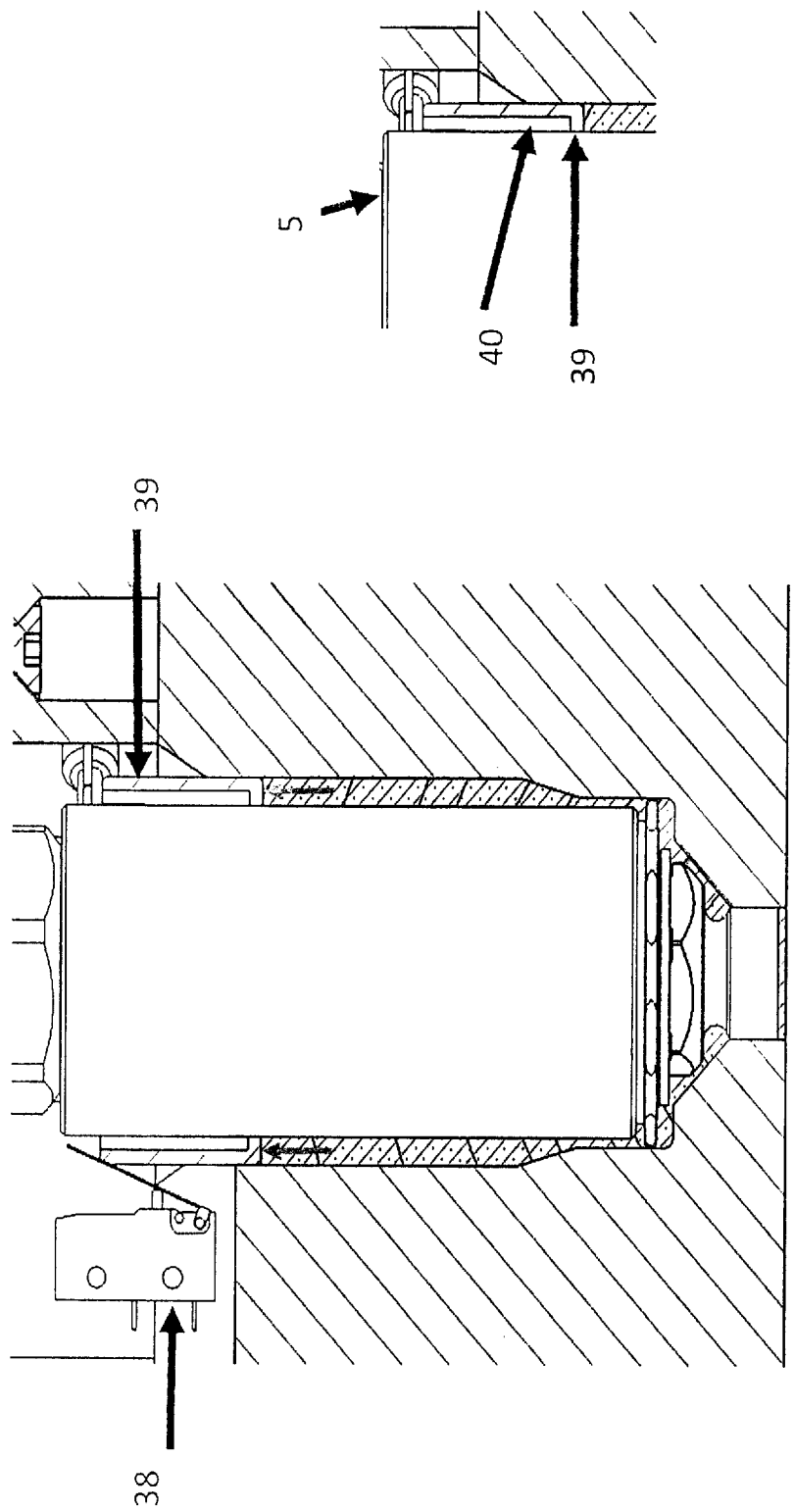

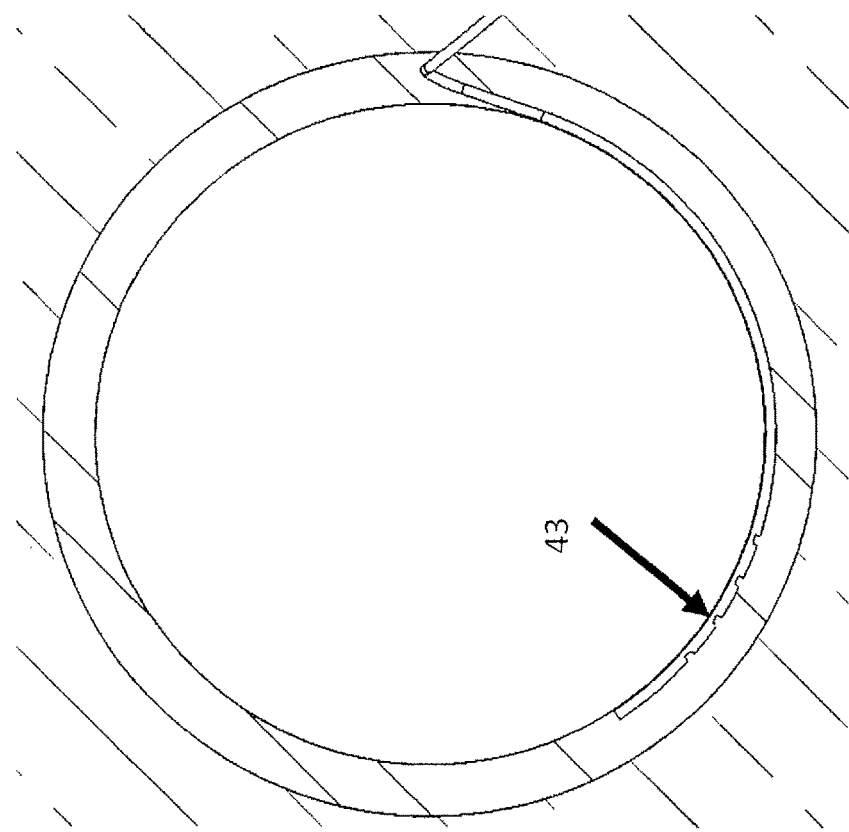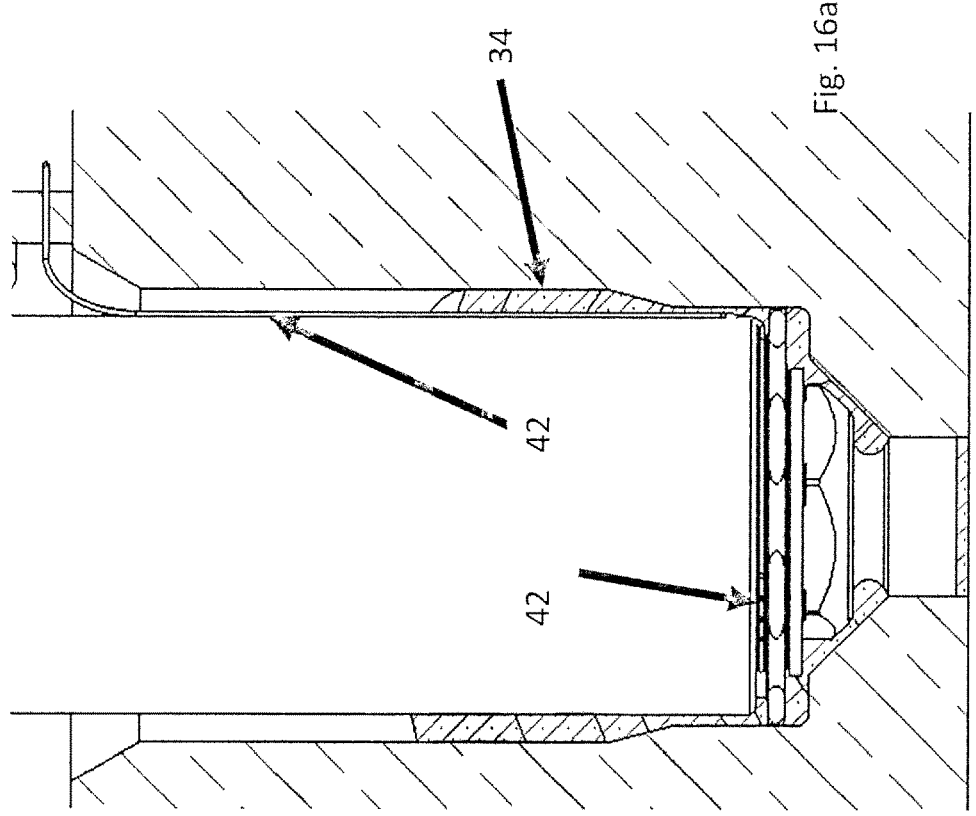

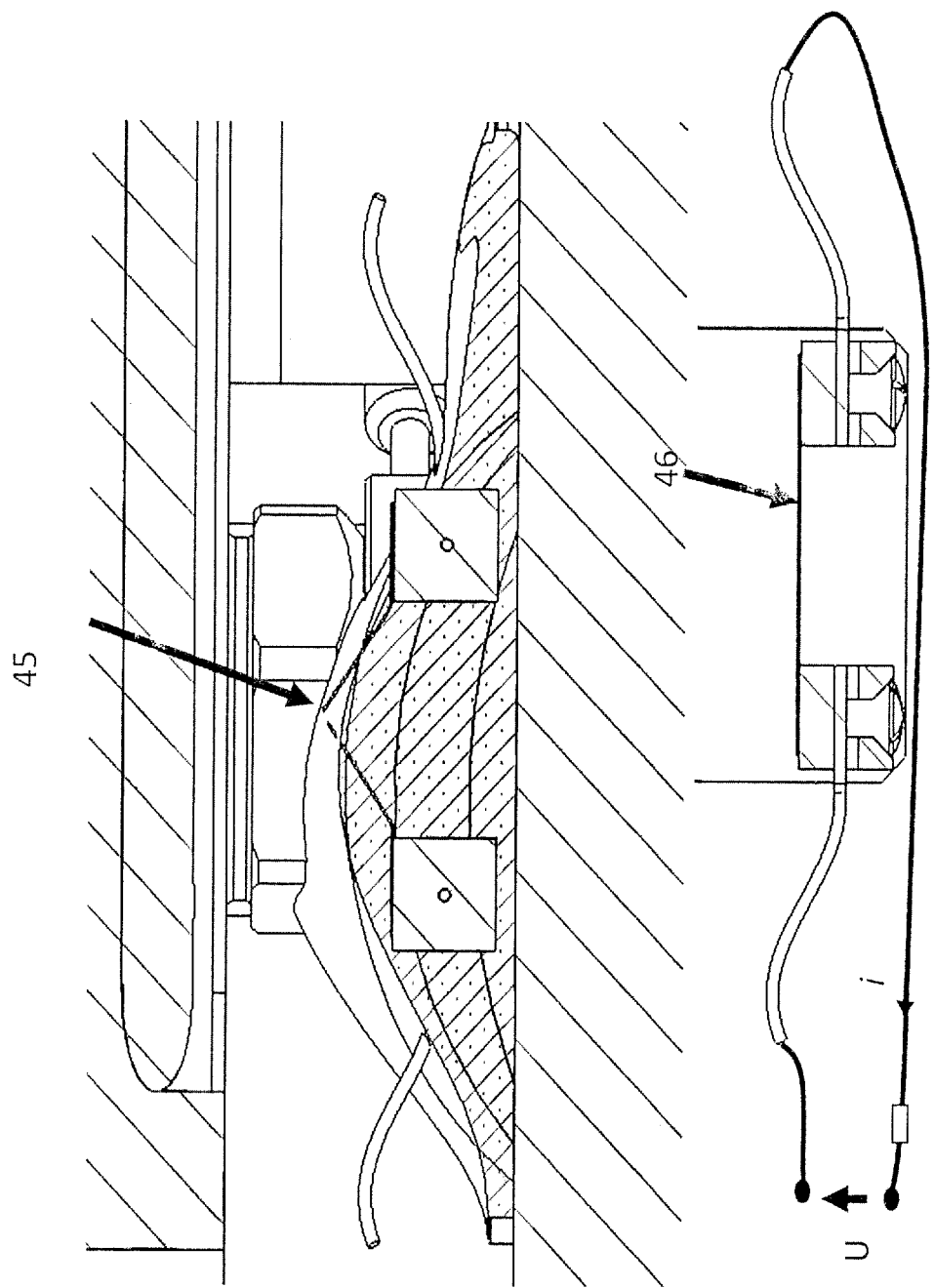

METHOD AND INJECTION MOLDING MANIFOLD ADAPTED FOR LEAK DETECTION DURING INJECTION MOLDING

CROSS-REFERENCE TO RELATED APPLICATIONS

Not Applicable.

FIELD OF THE DISCLOSURE

This invention relates to injection molding machines and in particular to an improvement in injection molding machines of the type having a nozzle mounted to inject a pressurized molten plastic into a mold cavity through a hot runner system adapted for leak detection during injection molding.

BACKGROUND OF THE DISCLOSURE

Typically, such injection molding machines employ manifolds having one or more nozzles. Although the nozzles are sealed or tightly fitting to prevent leakage of the molten plastic from between the nozzle and sprue bushing, it is a known reoccurring problem that such leakage does take place with resultant problems including, among others, delivery of an inadequate supply of plastic into the mold, loss of proper pressure, material waste, damage to sensitive controls and parts of the machine due to for example the high temperatures of the leaking molten plastic material and consequential machine down time for repairs and high finished part scrap. Nozzle leaks, although principally occurring at the interface of the nozzle end cap are known to occur at other locations associated with the nozzle such as for example at the inlet nozzle to the manifold which delivers the molten plastic to the nozzle. Depending on where the nozzle leak occurs and the rate of leakage, the leaking molten plastic can flow over different courses or paths. For example, in one type of leak, the molten plastic mushrooms or billows out from between the nozzle end cap and into the air space surrounding the nozzle heater. Other leaks are of a slow glittering type which actually clings to and creeps down the length of the nozzle eventually encrusting the nozzle or reaching the sensitive areas associated with the machine's operations.

It would therefore be highly desirable to provide means to detect leaks associated with the nozzle of such machines so that corrective measures can be initiated before damage to expensive parts of the molding machine or excess scraped parts is encountered.

SUMMARY OF THE DISCLOSURE

The problem is solved by an injection molding hot runner system according to the claims.

The injection molding hot runner system adapted for leak detection during injection molding comprises a manifold and a housing surrounding the manifold, additional components of the hot runner system are the inlet nozzle and the outlet nozzle(s). The manifold can have different structures and components. The manifold can have one or several nozzles and interfaces/bores for actuators driving (opening or closing) the nozzles. Also the manifold can be made of one or more sub-manifold which are linked to each other at internal joints. The manifold comprises an internal channel in which the molten plastic is transported to the nozzles. The nozzles are in connection with the channel. Furthermore, the manifold is surrounded by a housing. The manifold and the housing are spaced apart defining one or more pockets. The pockets are defined by the space between the outer wall of the manifold and the inner wall of the housing. Supports in the form of struts define the space between the manifold and the housing. The housing can be made of several plates. The manifold comprises one or more junction points establishing a connection to one or more components attached to the manifold. These components can be nozzles, inlet nozzles, inlet lines for the plastic, actuators driving the nozzles, other manifolds/sub-manifold. At the at least one sensor can be located in the pocket at each junction point. The sensor is preferably located in the vicinity of the junction points, so that molten plastic passing through a leak into the junction points is detected. In a preferred embodiment, the sensor is located in a way that it is not influenced by the properties of the housing or the manifold. For example, the sensor can be located to prevent heat or expansion of the housing or the manifold from causing a false leak alarm.

Furthermore, the sensor is configured to indicate a leak, when getting in contact with the molten plastic due to a leak at the junction point.

In a possible embodiment, the junction point is a bore to mount a support strut spacing apart the manifold and the housing. The bore can due to cracks, component fatigue, or quality fluctuations extend into the manifold and molten plastic can pass through the bore into the pocket. Also, the support can be located close to the bore of another component, for example, the nozzle, to serve as a support for the sensor. In this case the support has two functions. One to define the spacing and the other to support or hold the sensor.

Another junction point is a bore in the manifold or housing to mount an injection nozzle. The injection nozzle is connected with its inlet to the manifold and the channel within the manifold. The nozzle is connected via a nozzle shank to the bore in the manifold. This connection can use threads and sealings. It is possible that due to malfunction of the sealing a leak at the nozzle shank can occur and molten plastic pour out into the pocket. The injection nozzle passes through the pocket into an opening/bore of the housing to the mold. The end cap of the nozzle or the interface of the end cap to the mold at the parting line can also be a cause for a leak. Also, this region can be defined as a junction point to locate a sensor.

Another junction point can be the bore in the manifold or housing through which a hydraulic, electric or pneumatic actuator extends driving the injection nozzle to open and close. A valve pin linear driven by the actuator pushes a needle of the nozzle to open or close the nozzle. The valve pin extends through a bore of the manifold into the nozzle. The seal (inner side to the valve pin) or outer side to the manifold can malfunction causing molten plastic to leak into the pocket.

It can be derived from above that a junction point can be a joint, a thread or an interface where parts are assembled and where a leak can occur from which molten plastic can escape.

In a possible embodiment, the bore of the housing in which the nozzle heater is located, is in communication with the pocket, so that due to a leak at the tip of the injection nozzle molten plastic extends into the pocket. The molten plastic flows between the housing wall and the nozzle heater into the pocket. In a possible embodiment, sensors around or on the nozzle heater can detect the flow of molten plastic due to a leak.

In a possible embodiment, the sensor is one or more of the following: a temperature sensor, a mechanical switch, temperature coil, a contact sensor, optical sensor, pressure sensor, inductive sensor, capacitive sensor, resistant sensor, piezo sensor.

The temperature sensor can detect the temperature deviation in comparison to normal conditions. In case of a leak, hot plastic might cause a temperature increase in the pocket in comparison to a standard temperature. In case a preset threshold at preferably a defined time of the process has been passed a leak can be detected. The threshold can be defined as a function over time.

A mechanical switch can establish or interrupt an electric line, when getting into physical contact with the molten plastic. A coil can change its electrical properties when the temperature is increasing due to the molten plastic surrounding the coil from the outside. For example, the heating coil of the nozzle heater can have a different resistance when getting surrounded by molten plastic or needs different power/current to heat the nozzle. The deviation of the current from normal conditions can be detected and a leak can be indicated.

Another sensor could be a contact sensor. The contact sensor can be an electrical/optical sensor or a mechanical sensor which is activated when the leaking plastic is getting into contact with the sensor. Mechanical means that a mechanical element is pushed or bent to activate the switch. Optical means that light beam or window of the sensor is covered, so that the light beam cannot pass through.

Also an optical sensor can be used which indicates that a certain area or a path is covered by the leaking plastic. The optical sensor comprises a light source and a detector that detects a certain light pattern, which cannot be recognized when the leaking plastic extends into the space between the light source and the detector. Also, a laser sensor can be used that detects a certain distance which is measured by the laser which is interrupted by the leaking plastic.

In a possible embodiment, the optical sensor is a fiber sensor, indicating different light distribution when getting in contact with the molten plastic. The fiber can be covered, broken or bent and can cause a different light distribution or internal reflection.

Other examples of sensors can be a pressure sensor or a piezo sensor, measuring the pressure which is exerted by the leaking plastic in the pocket. When the leaking plastic is pressed into the pocket the pressure change can be detected and a signal can be generated. The pressure sensor can be implemented as piezo sensor or other type of pressure sensor. Also inductive sensors can be used which measure the capacity change due to liquid plastic surrounding the sensor. A resistance sensor or frequency/alternating current resistance sensor measuring the resistance between two points/electrodes in the pocket can be used. When the leaking plastic extends between the two points a different resistance can be measured to indicate that a leak has occurred.

In a possible embodiment, the temperature sensor is connected to an upper wall of the pocket extending into the pocket space from above. This hanging attachment allows a location in the middle of the space defined by the pocket to minimize the influence of the housing or manifold. The front part of the sensor has an L-shape, so that the sensor tip extends downward into the pocket. In a possible embodiment, the front part is insulated to avoid heat from the manifold influencing the temperature sensors.

In a possible embodiment, the temperature sensor is insulated to reduce the temperature influence of the housing and manifold. The insulation surrounds the sensor. In a preferred embodiment, only the sensor tip freely extends into the pocket. The insulation holds the sensor in its position and shields the sensor from the heat radiation of the housing and the manifold. Also, it is possible that the sensor is located in a metal plate which is sandwiched between insulation materials. The metal plate comprises a bore in which the sensor is located. The tip of the sensor is located in an extended bore having a larger diameter.

In a possible embodiment, the temperature sensor is insulated by ceramic components. Other materials which are heat resistance for example based on aluminosilicate can be selected.

In a possible embodiment, the insulation is surrounding the support struts and the temperature sensor is attached to the insulation. The attachment can be a bore through which the sensor extends. Also, it is possible that the struts are made of a material with lower thermal conductivity as the manifold. For example, the support struts are made of a metal with a lower thermal conductivity than the metal/steel of the manifold and/or housing. Also the support struts can be made of a ceramic compound themselves.

In a possible embodiment, the insulation has a tubular form with an inner bore in which the strut is located and supported. The tubular wall comprises a bore following a secant, in which the sensor is located parallel to a radius.

In a possible embodiment, several sensors are located in one tubular insulation. Preferably, the sensors are located on opposite sides of the support strut.

In a possible embodiment, the temperature sensor is configured to detect a temperature deviation, when getting in contact with the molten plastic passing through the leak. The sensor is connected to a controller that stores thresholds or parameter curves that indicate a leak. The curves can be time related and/or process related. The curves can indicate that at a certain point of time/process time the sensor value has to be below a certain value.

In a possible embodiment, the nozzle assembly comprises a nozzle shank being fastened to the manifold. The shank can be screwed into the manifold by the use of threads. A tubular heater which is connected to the shank extends into a bore of the housing. In a possible embodiment, the temperature sensor is located at the vicinity of the tubular heater and the nozzle shank in the pocket. The shank is partially located in the pocket. This location allows that the sensor can detect a leak at different positions.

In an alternative embodiment, an injection molding hot runner system adapted for leak detection during injection molding is disclosed. The hot runner system comprises a manifold and a housing surrounding the manifold, wherein the manifold and the housing are spaced apart defining one or more pockets. A nozzle assembly extends from the manifold via the pocket through a bore of the housing. The nozzle end cap is in connection with the mold. The nozzle establishes the connection between the manifold and the mold extending through the housing. The nozzle assembly comprises a nozzle heater located in the bore. A sensor is located in the bore in which the nozzle heater extends to detect leaking plastic pressed through the bore.

Also this embodiment uses the sensors mentioned above, namely, the sensor is one or more of the following: a temperature sensor, a mechanical sensor, mechanical switch, temperature coil, a contact sensor, optical sensor, pressure sensor, inductive sensor, capacitive sensor, resistant sensor, or piezo sensor.

In a possible embodiment, the sensor is located on or in the nozzle heater or at the upper end of the nozzle heater.

In a possible embodiment, the sensor is located in a groove or on an outer shell of the nozzle heater. This groove can be circumferential or longitudinal. In the groove, a temperature sensor can be located, which detects leaking plastic which is pressed between the bore in the housing and the nozzle and which is pressed towards the nozzle shank.

In another embodiment, the sensor is located in the pocket close to the bore in the housing through which nozzle assembly extends. The sensor can detect when leaking plastic passes through the bore into the pockets the moment when the plastics enters the pockets.

A heating coil which is used by the heater can also be used as a leak sensor. A controller analyzes the current needed to drive the heater to a certain temperature. When the current need deviates from standard predefined values, which are stored by the controller, the controller indicates a leak. When the current used to drive the heating coil passes a preset threshold value at a certain time of the process a leak can be detected.

In a possible embodiment, a mechanical sensor when getting in contact with the molten plastic is configured to indicate a leak. The mechanical sensor is a switch configured to close and/or open when getting in contact with the molten plastic. In a possible embodiment, the mechanical sensor is a wire configured to break when getting in contact with the molten plastic. The wire can be a wire mesh that surrounds the nozzle heater or nozzle assembly and that can change the resistance when getting into contact with leaking plastic, due to deformation or braking of the wires of the mesh. The mesh can also trigger a mechanical sensor which is connected to the mesh to indicate a leak in case of a displacement of the mesh.

In a possible embodiment, the mechanical sensor has the form of a tube located around the nozzle assembly, configured to get pushed by molten plastic to establish a contact. The tube surrounds the nozzle assembly in the bore of the housing. When the molten plastic extends into the bore, the tube is pushed and relocated within the bore, which can cause a sensor which is connected to the tube or which is able to detect the relocation to indicate a leak.

The above and further advantages of the invention may be better understood by referring to the following description in conjunction with the accompanying drawings.

BRIEF DESCRIPTION OF THE DRAWINGS

FIGS. 2a and 2b show the junction points of the devices of FIGS. 1a and 1b where leakage can occur.

FIG. 3 shows a sectional view of the tip of the nozzle, with possible leakage areas.

FIG. 7 shows in a sectional view an arrangement of a temperature sensor in the pocket, the sensor is held by a spacer connected to the manifold and extends from the manifold into the pocket in the vicinity of the bore in the housing of the hot runner system.

FIGS. 9a and 9b show in a sectional view two different arrangements of a temperature sensor within the pocket. In one arrangement a first sensor is attached to the support strut adjacent to the bore of the housing, and second the sensor is fixed to the manifold and extends parallel to the manifold in the pocket.

FIGS. 15a and 15b show an embodiment of the sensor of FIG. 13 wherein the sleeve is pushed upwards by leaking plastic and has activated a switch.

FIGS. 16a and 16b show a fibre optic comprising grooves which can be covered and filled by molten plastic interrupting or reducing the light passing through the fibre optic or changing the reflection.

FIGS. 18a and 18b show examples of metal contacts which are broken due to the plastic pressed into the pocket.

DETAILED DESCRIPTION OF POSSIBLE EMBODIMENTS

Figure 1A:
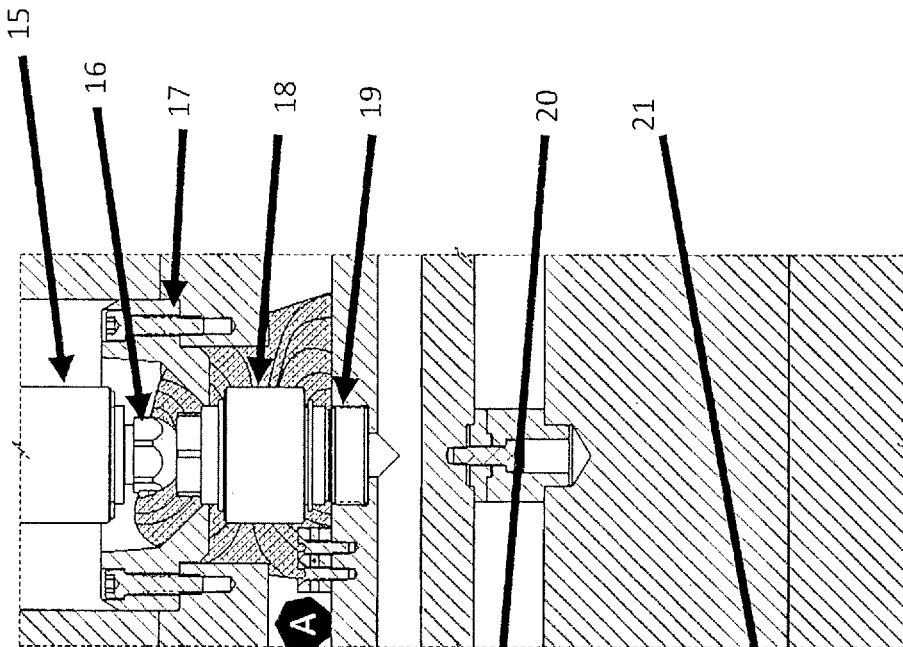
FIG. 1a shows a sectional view through a hot runner system, showing the nozzle being connected to the manifold and extending through the housing into the mold.

FIG. 1a shows a sectional view through a hot runner system, showing the nozzle being connected to the manifold and extending through the housing into the mold. The manifold is surrounded by a housing which consists of several plates. The plates can comprise a stationary plate and a top clamp plate, which are both located above the manifold. Furthermore, the housing comprises one or more manifold plates which is/are located at the side of the manifold. Below the manifold is the A-plate and B-plate. Between both plates the mold is located in which the part is manufactured. The A-plate and the B-plate are separated by a parting line. In the B-plate, a cavity insert is located defining the mold. Between the plates and the manifold supports are located, comprising an upper support and a lower support, defining a space between the housing/plates and the manifold. This space is also called a pocket. In this pocket, sensors can be located. Also a tubular heater located in a groove in the manifold is accessible via the pocket. The A in the FIGS. 1a and 1b indicate possible locations of the sensors.

The nozzle end cap of the nozzle abuts the mold at the lower end of the A-plate. The end cap seals the nozzle tip in the A-plate against the mold, which is also called the gate area. The nozzle comprises a nozzle heater which is located in a bore of the A-plate, which extends into the pocket. In case of a leak at the end cap, the molten plastic can be pressed through the bore into the pocket, surrounding the nozzle heater.

Figure 1B:
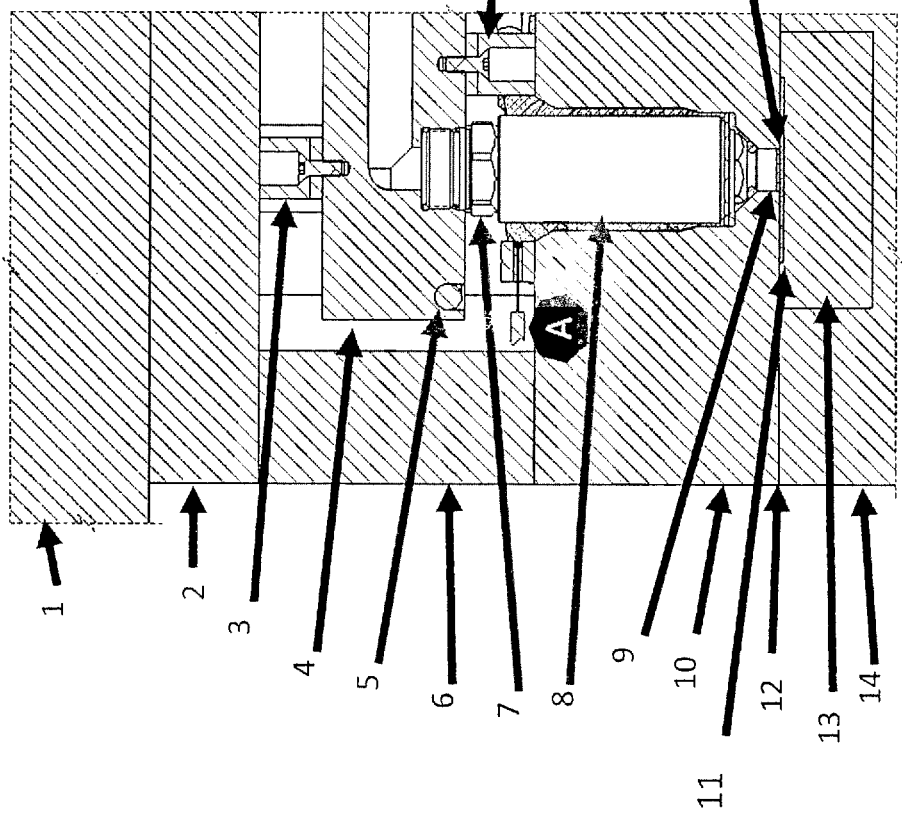
FIG. 1b shows a sectional view through a hot runner system, showing a machine nozzle, which controls the entrance of the molten plastic into the manifold.

FIG. 1b shows in a possible embodiment the machine nozzle comprising a machine nozzle tip at the inlet nozzle of the manifold. When the injection machine injects the machine the nozzle is opened and the inlet nozzle is opened and the plastic extends into the manifold towards the nozzle(s). Also, the machine nozzle has a heater, a shank and a machine nozzle tip. A locating ring, by which the mold is aligned takes care of the exact mold positioning. Both nozzles, inlet and outlet, can be responsible for leaks since several parts are assembled via interfaces. Also the fixation at the manifold can be responsible for a leak. FIG. 1b shows a sectional view through a hot runner system, showing a machine nozzle, which controls the inlet of the molten plastic into the manifold.

FIGS. 2a and 2b show the junction points of the devices of FIGS. 1a and 1b and where leakages can occur. As it can be derived from FIG. 2a, the internal joint for the (outlet) nozzle shank to the manifold can be a leakage area. Consequently, a sensor which is located in this area can detect a leak quickly. The end cap inside the shank of the nozzle is a possible leakage area. Also, the gate area and the external joint of the end cap to the mold can be possible leakage areas, which causes, that the plastic can escape from the mold into the bore of the nozzle in the A-plate. With respect to the inlet nozzle (FIG. 2b), the possible leakage area is the internal joint of the inlet nozzle to the manifold and the external joint of the machine nozzle tip to the inlet nozzle. Also the nozzle itself can leak.

FIG. 3 shows a sectional view of the nozzle tip inside the shank. The end cap and the nozzle tip comprise an internal joint and an external joint. The internal joint seals against the shank/tip closing the nozzle. The tip is located within the shank. The external joint seals the end cap against the mold. Both joints can be responsible for a leakage when not fixed correctly.

Figure 4:
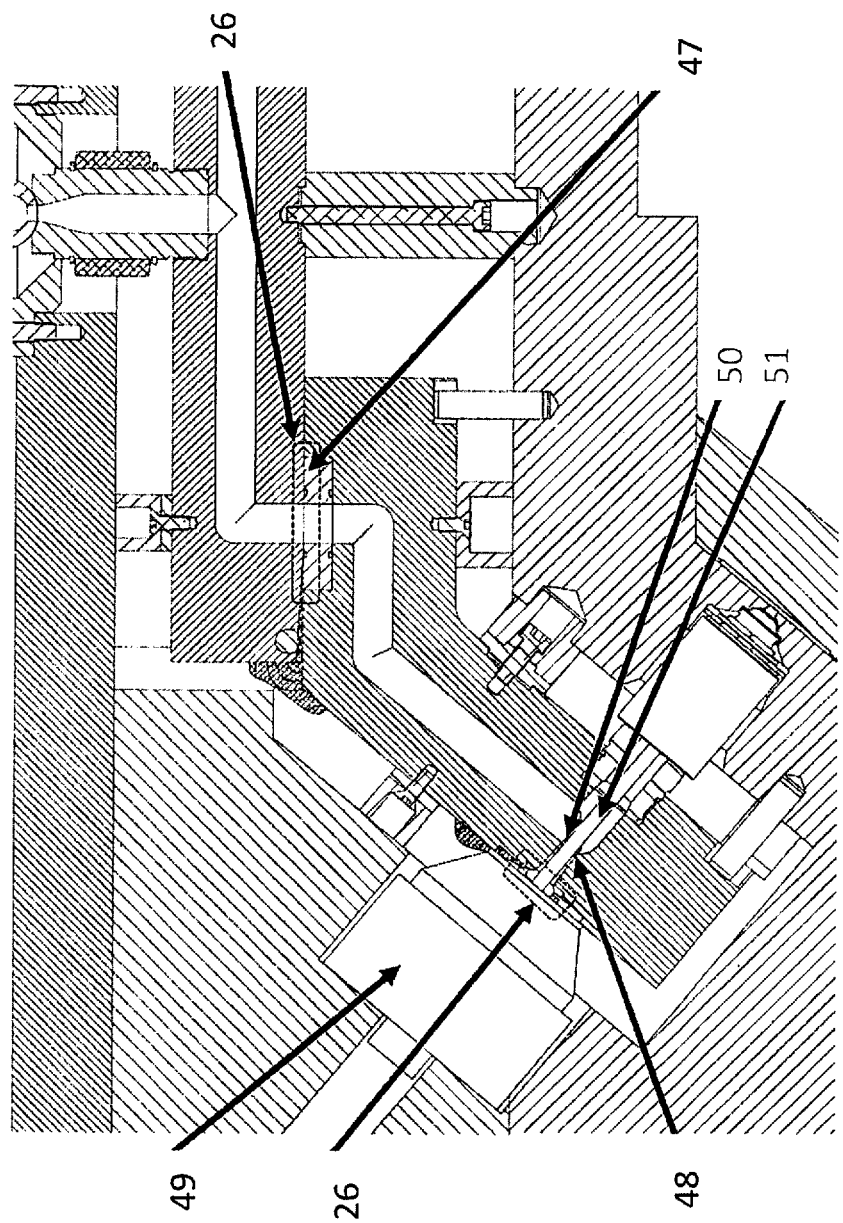
FIG. 4 shows a sectional view of a larger hot runner assembly consisting of two manifolds which are joined to each other, causing a possible leakage area, furthermore the hydraulic, electric or pneumatic actuator is displayed, driving the nozzle and extending through the manifold providing additional possible leakage areas.

FIG. 4 shows a sectional view of a larger hot runner assembly consisting of two manifolds which are joined to each other, causing a possible leakage area. This internal joint of one manifold to another manifold can cause a leaking. Furthermore, the hydraulic, electric or pneumatic actuator is shown driving the (outlet) nozzle by a pin and extending through the manifold providing additional possible leakage areas. The pin is moved by the actuator extending into the manifold towards the tip, or retracting from the manifold. The joint of the pin is sealed by a sleeve seal. The seal is in contact with the manifold at its outside and at its inside is in contact with the pin. Both contact areas can be a leakage area.

Figure 5B:
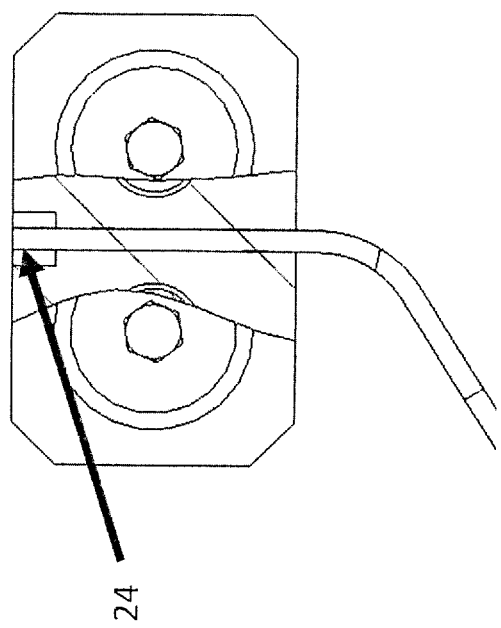
FIGS. 5a and 5b show an arrangement of a temperature sensor attached to support struts, being insulated and sandwiched between ceramic insulating material.
Figure 5A:
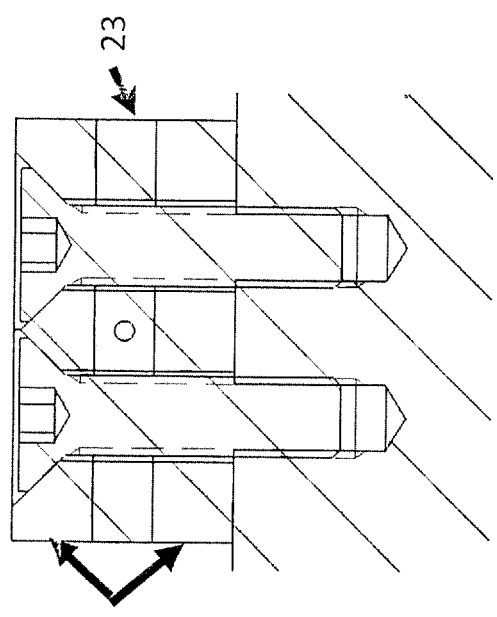

FIGS. 5a and 5b show an arrangement of a temperature sensor attached to support struts, being insulated and sandwiched between ceramic insulating material. In FIG. 5a, a sectional view of two support struts is shown, which are spaced apart. In between the two support struts a sensor is located, as it can be derived from FIG. 5b. The sensor is located in a bore of a steel plate. The steel plate is sandwiched by two ceramic plates insulating the sensor from the manifold and the plates/housing. FIG. 5b shows that the tip of the sensor (TC probe) is located in an extended bore, which provides a space around the tip in which the leaking plastic can extend, which allows a better quality of the sensor values.

Figure 6B:
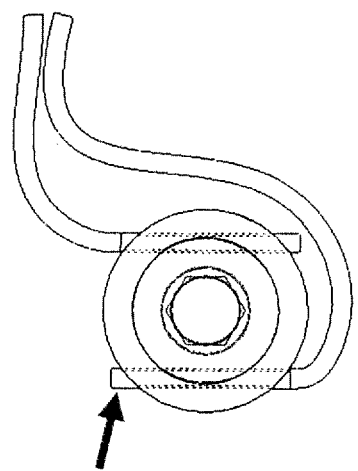
FIGS. 6a and 6b show an arrangement of a temperature sensor attached to support strut, being insulated and surrounding a support strut.
Figure 6A:
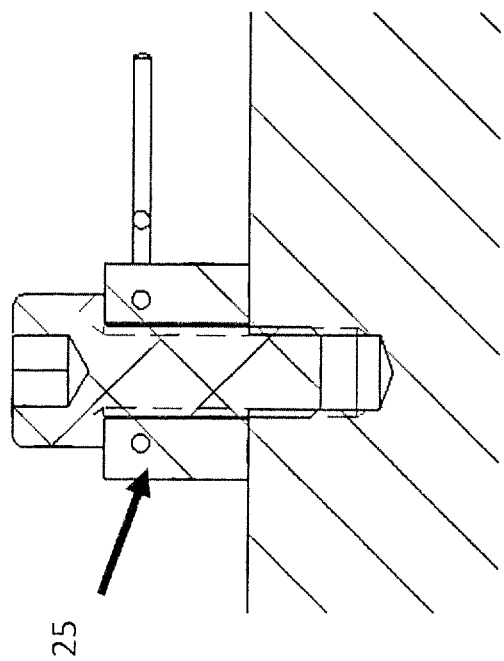

FIGS. 6a and 6b show an arrangement of a temperature sensor attached to a support strut, being insulated and the sensor surrounds the support strut in the insulator. The support strut is surrounded by a tubular ceramic insulator. The insulator comprises two bores (one bore is also possible) in which the sensors (TC-probe) are held. The bore extends in the form of a secant through the insulator. The tip of the sensor is outside the insulator.

FIG. 7 shows in a sectional view an arrangement of a temperature sensor in the pocket, the sensor is held by a spacer connected to the manifold and extends from the manifold into the pocket in the vicinity of the bore in the housing of the hot runner system. The spacer is insulated to avoid the heat of the manifold which has an impact on the sensor (TC). The front part of the sensor is bent downwardly so that the tip of the sensor located in the center of the pocket or at least spaced apart from the manifold and the housing, in the vicinity of the nozzle shank and the bore in the housing through which the heater extends. When the leaking plastic is pressed through the bore into the pocket, the tip gets into contact with the surface of the plastic, providing ideal temperature information.

Figure 8:
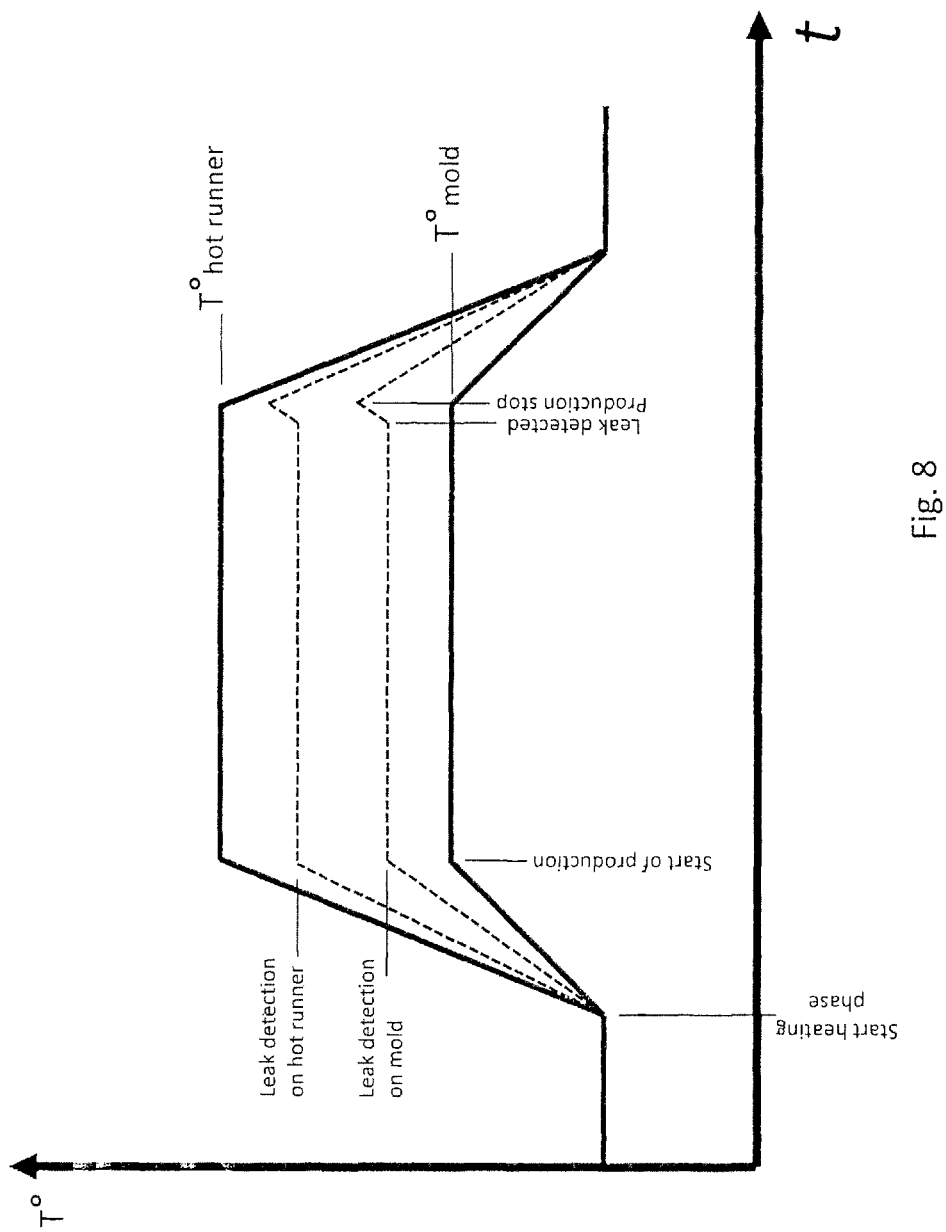
FIG. 8 is a diagram showing the temperature deviation in case of a leak within the hot runner system or in the mold measured by a temperature sensor in the pocket.

FIG. 8 is a diagram showing the temperature deviation in case of a leak within the hot runner system or within the mold measure by a temperature sensor in the pocket. The diagram shows different temperature curves over a timespan. The timespan represents the operation cycle. At the beginning of the operation cycle, the start of the heating phase is shown in which the temperature in all components rises. The temperature in the hot runner system (manifold) and the mold is rising, too. The temperature in the mold is, in general, lower than in the hot runner system itself. The dotted lines indicate the temperature measured by a leakage temperature sensor at different locations. The leakage temperature sensor measuring the higher temperature is preferably located in the pocket as shown in FIGS. 9a and 9b. The leakage temperature sensor measuring the lower temperature is preferably located close to the mold, for example, in the bore of the nozzle in the A-plate. In case of a temperature peak, the controller connected to the sensors stops the operation and turns off the heating system or at least indicates an alarm.

FIGS. 9a and 9b show in a sectional view two different arrangements of a temperature sensor within the pocket. In one arrangement, a second sensor 2 is attached to the support strut adjacent to the bore of the housing, and a first sensor 1 is fixed to the manifold and extends parallel to the manifold in the pocket. The first sensor measures the temperature of the manifold close to the tubular heater attached to the manifold. This sensor can be the sensor in FIG. 8 which measures the temperature of the hot runner system. The second sensor can be the leakage detection sensor measuring the higher temperature indicated by the dotted lines. The sensor is connected to a strut made of a metal (steel) with lower thermal conductivity. In case of a leak as disclosed in FIG. 9b, a temperature peak can be measured at the second sensor as displayed in FIG. 8 and FIG. 11. In general, the manifold temperature is beside the nozzle and inlet nozzle temperature which is the highest temperature. The curve shows this also (T° hot runner). The leakage thermocouple shows a temperature between the manifold temperature and the mold temperature (Leak detection on hot runner).

Figure 10B:
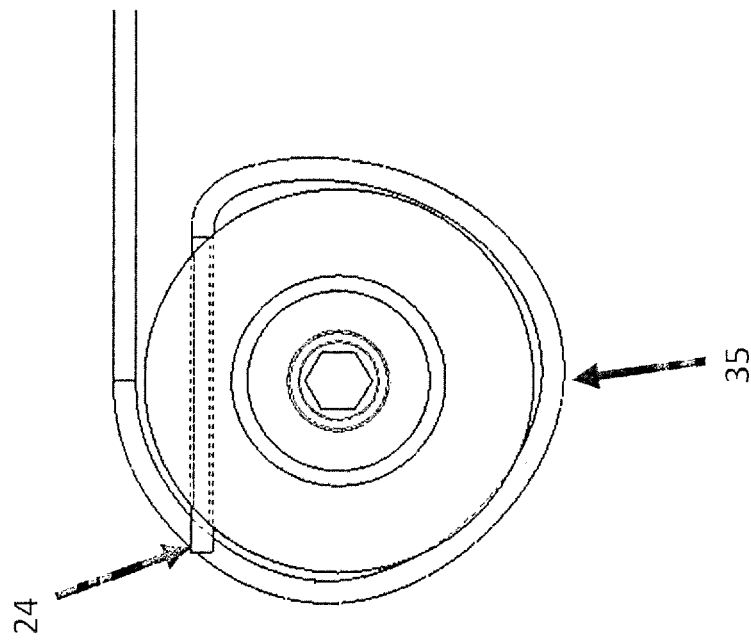
FIGS. 10a and 10b show embodiments where the sensor is wound around the support strut and fixed with a clip.
Figure 10A:
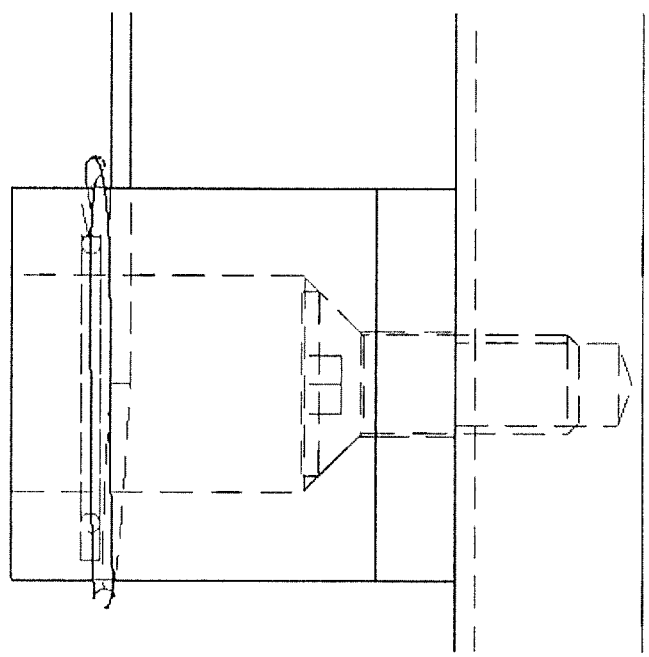

FIGS. 10a and 10b show embodiments where the sensor is wound around the support strut and fixed with a clip. The sensor TC-probe also partially passes through a bore in the support strut, wherein the tip is exposed.

Figure 11:
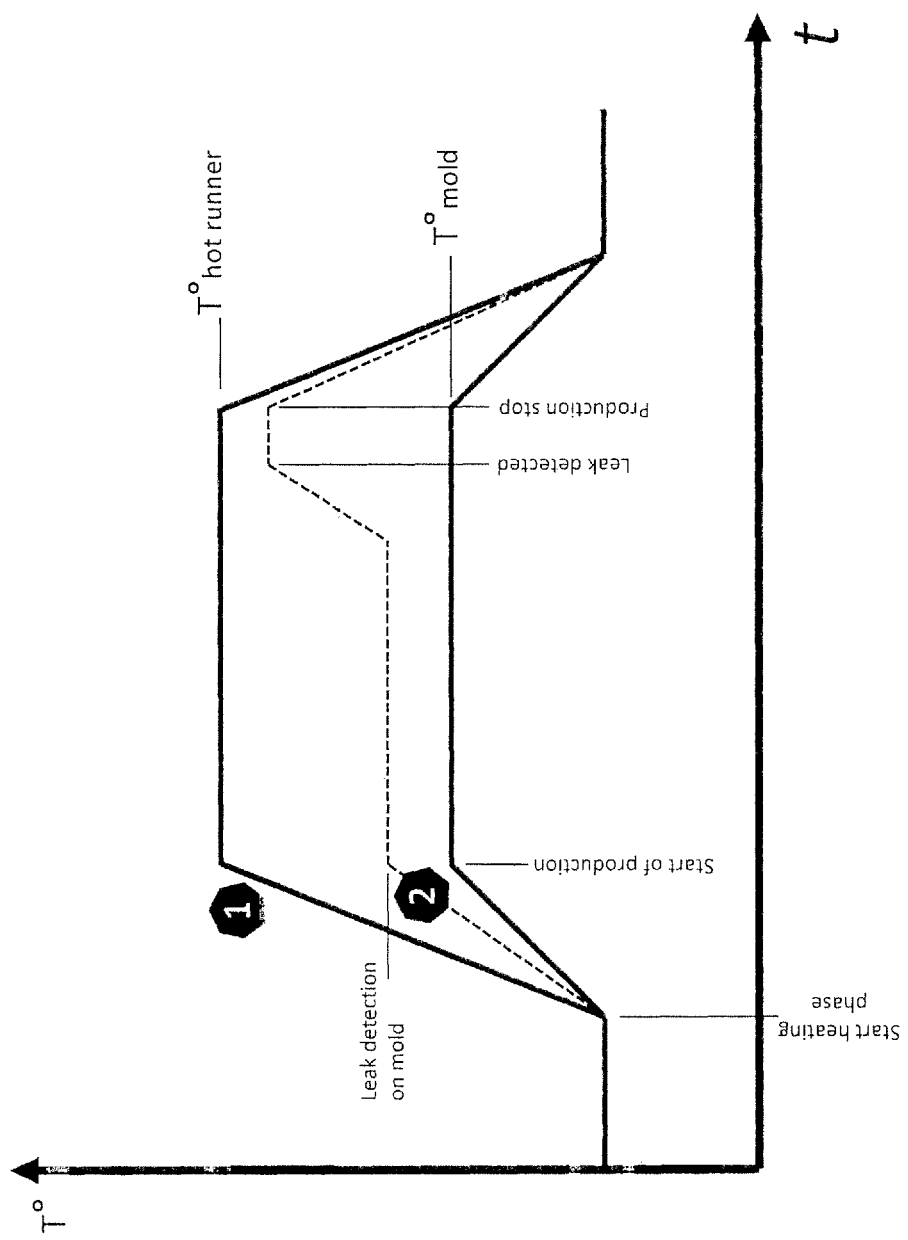
FIG. 11 shows a time-temperature diagram with reference to the temperature sensors in FIGS. 9a and 9b and the sensor information of sensor 2 in case of a leak.

FIG. 11 shows a time-temperature diagram with reference to the temperature sensors in FIGS. 9a and 9b and the sensor information of the second sensor 2 in case of a leak. In case the temperature difference between the hot runner temperature and the leak detection sensor falls below a predefined threshold, and at a certain time of the production process a leak is detected, the production process is stopped.

Figure 12:
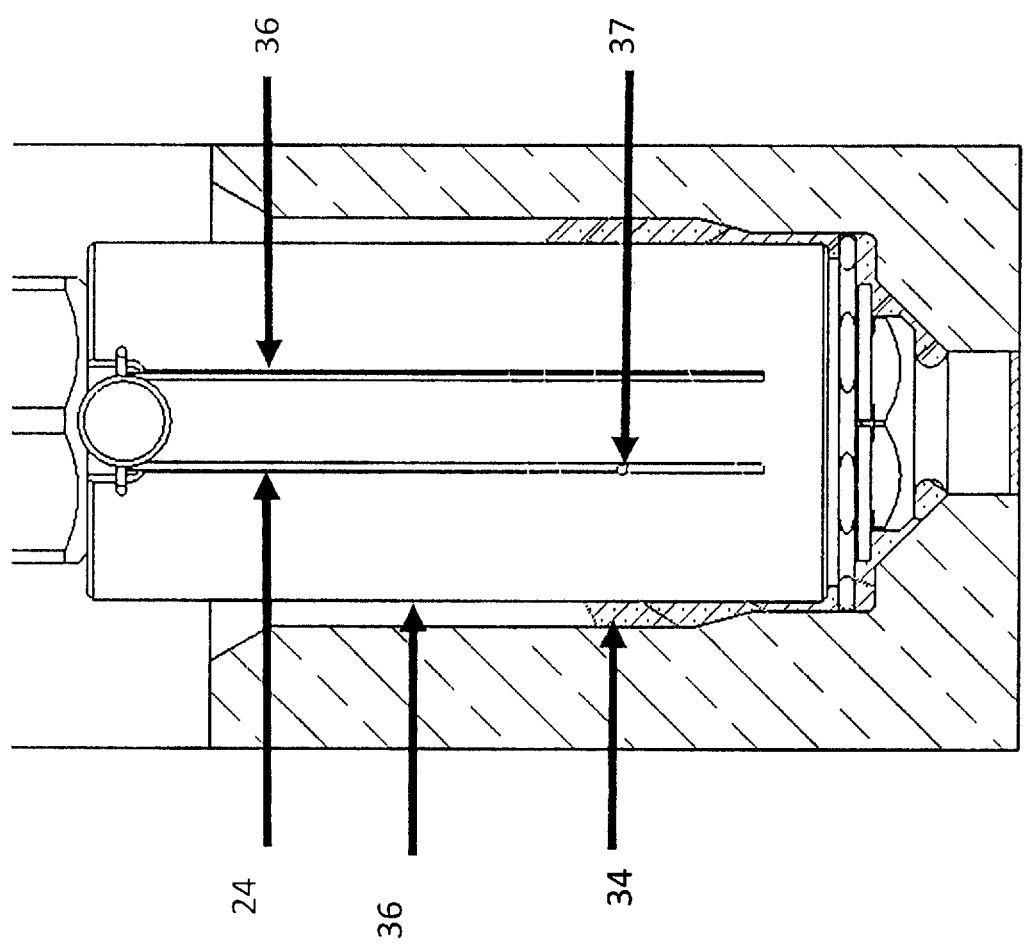
FIG. 12 shows sensors on the nozzle heater sleeve which surrounds the heater of the nozzle, and which get into contact with molten plastic in case of a leak at the tip of nozzle or the molten.

FIG. 12 shows sensors (TC) on the nozzle heater sleeve which surround the heater of the nozzle, and which get into contact with molten plastic in case of a leak at the tip of nozzle/nozzle cap or the mold itself. The sensors can be located in a groove of the sleeve or on the sleeve itself. Parallel to the sensor TC for the control of the heater a sensor for controlling the heat detection can be installed, which is located close to the nozzle end cap, so that molten plastic of a leak in the mold or the end cap can be detected early.

Figure 13:
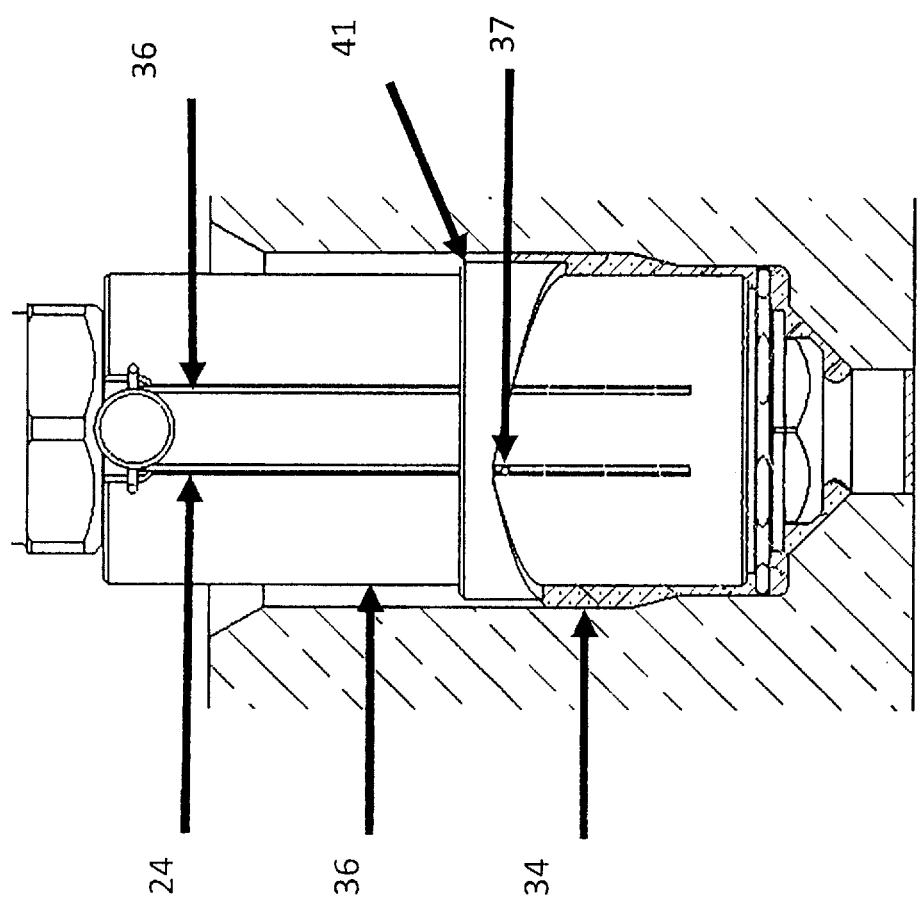
FIG. 13 shows a mechanical sensor in the form of a sleeve surrounding the heater, which can have different functions.

FIG. 13 shows a mechanical sensor in the form of a sleeve surrounding the heater, which is pushed upwards or downwards depending from the location of the leak. The position of the sleeve can be determined. In case the sleeve is pushed and repositioned by molten plastic, an alarm can be triggered. The position sensor can be an optical sensor, an electrical sensor or a mechanical sensor which indicates a displacement of the sleeve. Also, it is possible that the sleeve is fixed in a certain location and forces the plastic into a certain path by deflection of the flow of the plastic, so that the plastic is rerouted to the sensor e. g. a thermal sensor.

Figure 14:
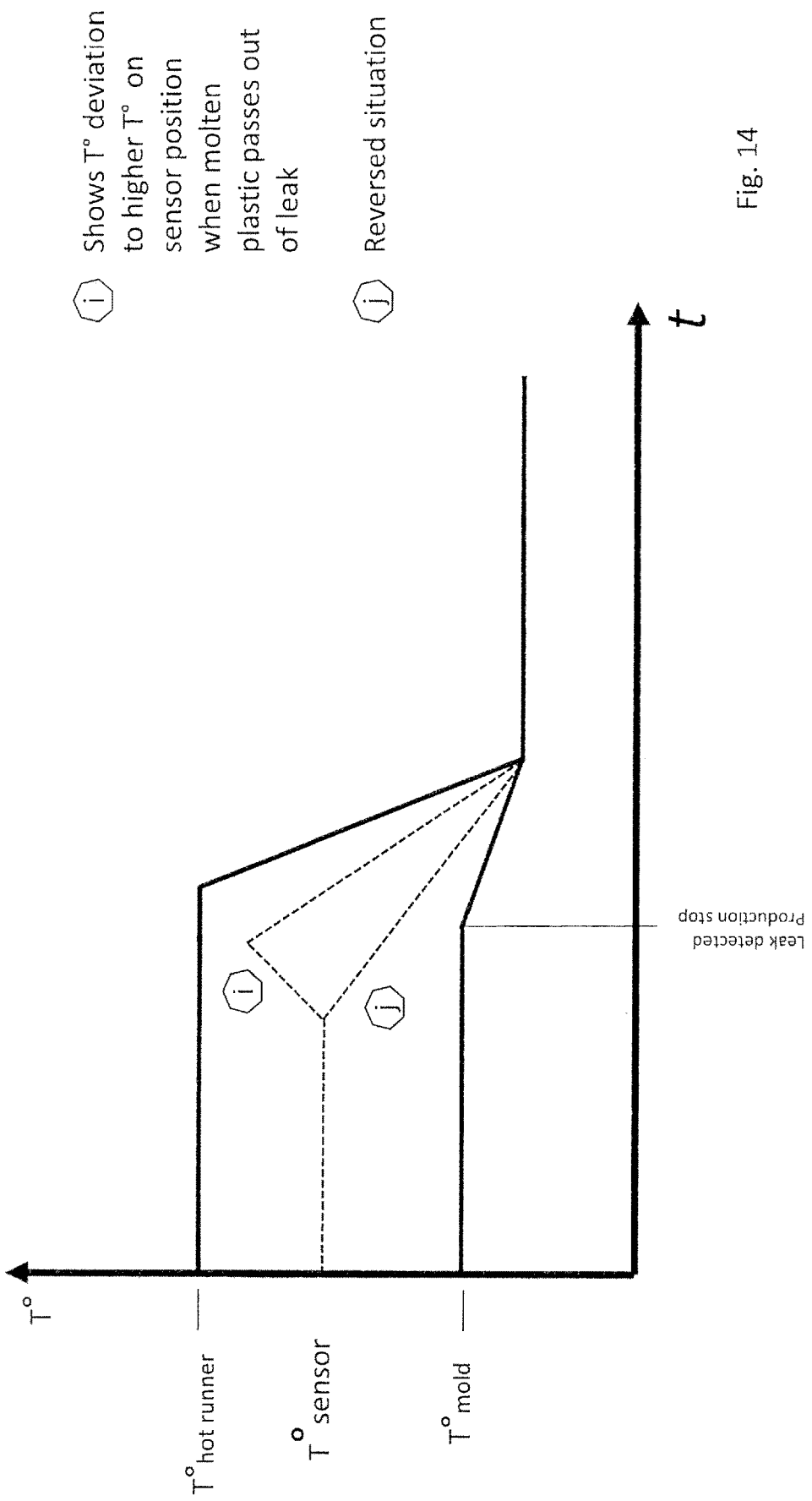
FIG. 14 shows a diagram of the time-temperature relation in case of a leak detection by a temperature sensor of FIG. 12.

FIG. 14 shows a diagram of the time-temperature in case of a leak detection by a temperature sensor of FIG. 12, which is located around the heater sleeve. In case of a leakage, the temperature measured on the sleeve is increased and the process is stopped (i). The reversed situation is described by the dotted line (j).

FIGS. 15a and 15b show an embodiment of a mechanical sensor of FIG. 13 where the sleeve is pushed upwards by leaking plastic and has activated a switch. In case the sleeve is forced upwards by leaking plastic, the mechanical switch is triggered and detects a movement of the sleeve, which is handled by a controller to stop the process. In FIG. 15b, a gap and a flange of the sleeve is disclosed so that the sleeve is only in contact with the heater at a very small part and the larger part of the sleeve is spaced apart providing an insulating air gap.

FIGS. 16a and 16b show a fibre optic comprising grooves which can be covered and filled by molten plastic interrupting or reducing the light passing through the fibre optic. The glass fibre extends axial along the heater (a radial arrangement is also possible), and comprises several grooves through/over which light can pass in normal operation. In case the groves are filled with plastic, the light cannot pass or a limited amount of light can pass which is an indication of a leak.

Figure 17:
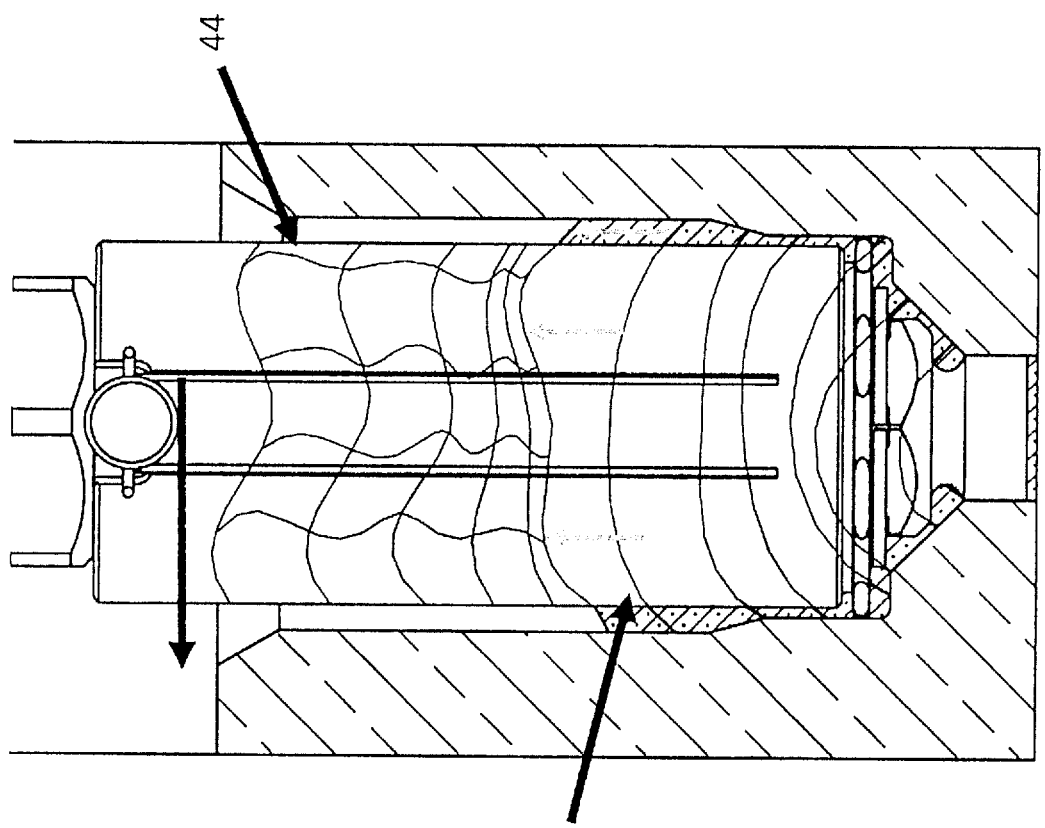
FIG. 17 shows a mesh surrounding the heater of the nozzle, being bent or broken when pushed by the molten leaking plastic changing the resistance of the mesh.

FIG. 17 shows a mesh surrounding the heater of the nozzle, being bent or broken when pushed by the molten leaking plastic, the mesh changes its resistance. This can be detected by a controller which is connected to the mesh.

FIGS. 18a and 18b show examples of metal contacts which are broken due to the plastic pressed into the pocket. A thin metal wire can be tensioned between to contact points. In case the molten plastic breaks the wire, the metal contact is interrupted and a leak can be detected due to the missing contact. The same approach can be used with a thin metal plate (copper, iron etc.) plate.

The present invention has been described in an illustrative manner. It is to be understood that the terminology which has been used is intended to be in the nature of words of description rather than of limitation. Many modifications and variations of the present invention are possible in light of the above teachings. Therefore, the present invention may be practiced other than as specifically described.

REFERENCE SIGNS

A possible location of a sensor
1 Stationary platen
2 Top clamp plate
3 Upper support
4. Manifold
5. Tubular heater
6 Manifold plate
7. Nozzle shank
8. Nozzle heater
9 End cap
10 A-Plate
11 Molded part
12 Parting line
13 Cavity insert
14 B-Plate
15 Machine nozzle
16 Machine nozzle tip
17 Locating ring
18 Inlet nozzle heater
19 Inlet nozzle
20 Lower support
21 Gate area
22 Ceramic or heat insulating material
23 Steel plate
24 TC probe
25 Insulator/Ceramic
26 possible leakage area
27 Internal joint shank to tip
28 External joint End cap to mold
29 spacer
30 Low T° conductivity steel (f.e. Ti)
31 High T° conductivity steel
32 Hot Runner e. g. 280° C.
33 Mold e. g. 80° C.
34 Leak of Molten Plastic
35 TC probe wound around support or affixed with clip
36 TC probe for heater control
37 Position of sensor for leak detection
38 Switch to detect movement
39 Sleeve which is forced upwards by plastic leaks
40 Insulating air
41 Leak guide sleeve to funnel plastic toward TC
42 glass fiber optic
43 Grooves that diffuse light differently when in contact with leaking plastic
44 Mesh that changes resistance or capacitor that shows different behavior when plastic flows by or moves it.
45 Molten plastic that opens electrical circuit
46 f.e. cu thin plate
47 Internal joint of manifold to manifold
48 internal join sleeve seal for valve pins in contact with valve pin (inner side) and manifold (outer contact area)
49 hydraulic, electric or pneumatic actuator
50 sleeve seal
51 valve pin
52 gate area external joint end cap to mold
53 End cap inside shank internal joint 54 Internal join nozzle shank manifold
55 External joint machine nozzle tip Inlet nozzle
56 Internal joint inlet nozzle manifold.

What is claimed is:

1. Injection molding hot runner system adapted for leak detection during injection molding, wherein the hot runner system comprises a manifold and a housing surrounding the manifold, wherein the manifold and the housing are spaced apart defining one or more pockets, the manifold comprises one or more junction points establishing a connection to a component attached to the manifold, wherein at the at least one junction point area a sensor is located in the pocket, wherein the sensor is configured to indicate a leak, upon contact with the molten plastic due to a leak at the junction point;
   wherein the sensor is a temperature sensor that is insulated to reduce the temperature influence of the housing or manifold; and
   wherein the temperature sensor is located between an upper and a lower insulation.

2. The injection molding hot runner system, according to claim 1 wherein the junction point is one or more of the following: a bore or thread in the manifold to mount an inlet or an injection nozzle, a manifold joint connecting two manifold sections, a bore in the manifold through which a hydraulic, electric or pneumatic actuator extends to drive the injection nozzle.

3. The injection molding hot runner system according to claim 1, wherein an injection nozzle extends from the manifold through a bore of the housing, wherein the bore of the housing is in communication with the pocket, so that due to a leak at the injection nozzle, molten plastic extends into the pocket, detectable by the sensor located in the pocket at the bore.

4. The injection molding hot runner system according to claim 2, wherein the sensor is connected to the support spacing apart from the manifold and the housing.

5. The injection molding hot runner system according to claim 1, wherein the housing comprises several plates defining the housing.

6. The injection molding hot runner system according to claim 1, wherein the sensor is one or more of the following: a temperature sensor, a mechanical switch, temperature coil, a contact sensor, optical sensor, pressure sensor, inductive sensor, capacitive sensor, resistance sensor, and piezo sensor.

7. The injection molding hot runner system according to claim 1, wherein the sensor is a temperature sensor connected to an upper wall of the pocket and extends downwards into the channel.

8. The injection molding manifold assembly according to claim 1, wherein the temperature sensor is insulated by a ceramic.

9. The injection molding hot runner system according to claim 1, wherein the insulation is surrounding the support and the temperature sensor is attached to the insulation.

10. The injection molding hot runner system according to claim 6, wherein the sensor is a temperature sensor configured to detect a temperature deviation upon, contact with molten plastic passing through the leak.

11. The injection molding hot runner system according to claim 2, wherein the injection nozzle comprises a nozzle shank being fastened into or onto the manifold, and wherein a temperature sensor is located at the vicinity of the lower or upper end of the manifold close to the nozzle shank or inlet nozzle.

12. An injection molding hot runner system adapted for leak detection during injection molding, wherein the hot runner system comprises a manifold and a housing surrounding the manifold, wherein the manifold and the housing are spaced apart defining one or more pockets, wherein a nozzle assembly extends from the manifold via the pocket through a bore of the housing, the nozzle assembly comprises a nozzle heater located in the bore, wherein a sensor is located in the bore in which the nozzle heater extends to detect leaking plastic pressed through the bore; and
   wherein the sensor is located on/in the nozzle heater or at the upper end of the nozzle heater.

13. The injection molding hot runner system according to claim 12, wherein the sensor is a temperature sensor configured to detect a temperature deviation upon contact with molten plastic passing through the leak.

14. The injection molding hot runner system according to claim 12, wherein a heating coil of the nozzle heater is used as a sensor indicating the leak when the current used to drive the heating coil passes a preset threshold value.

15. The injection molding hot runner system according to claim 12, wherein the sensor is a mechanical sensor upon contact with the molten plastic is configured to indicate a leak.

16. The injection molding hot runner system according to claim 15, wherein the mechanical sensor is a switch configured to close or open upon contact with the molten plastic.

17. An injection molding hot runner system adapted for leak detection during injection molding, wherein the hot runner system comprises a manifold and a housing surrounding the manifold, wherein the manifold and the housing are spaced apart defining one or more pockets, wherein a nozzle assembly extends from the manifold via the pocket through a bore of the housing, the nozzle assembly comprises a nozzle heater located in the bore, wherein a sensor is located in the bore in which the nozzle heater extends to detect leaking plastic pressed through the bore; and
   wherein the sensor is located in a groove on an outer shell of the nozzle heater.

18. An injection molding hot runner system adapted for leak detection during injection molding, wherein the hot runner system comprises a manifold and a housing surrounding the manifold, wherein the manifold and the housing are spaced apart defining one or more pockets, wherein a nozzle assembly extends from the manifold via the pocket through a bore of the housing, the nozzle assembly comprises a nozzle heater located in the bore, wherein a sensor is located in the bore in which the nozzle heater extends to detect leaking plastic pressed through the bore;
   wherein the sensor is a mechanical sensor upon contact with the molten plastic is configured to indicate a leak; and
   wherein the mechanical sensor is a wire configured to break upon contact with the molten plastic.

19. An injection molding hot runner system adapted for leak detection during injection molding, wherein the hot runner system comprises a manifold and a housing surrounding the manifold, wherein the manifold and the housing are spaced apart defining one or more pockets, wherein a nozzle assembly extends from the manifold via the pocket through a bore of the housing, the nozzle assembly comprises a nozzle heater located in the bore, wherein a sensor is located in the bore in which the nozzle heater extends to detect leaking plastic pressed through the bore;
   wherein the sensor is a mechanical sensor upon contact with the molten plastic is configured to indicate a leak; and wherein the mechanical sensor has the form of a tube located around the nozzle assembly, configured to get pushed by molten plastic and configured to indicate a relocation.

20. An injection molding hot runner system adapted for leak detection during injection molding, wherein the hot runner system comprises a manifold and a housing surrounding the manifold, wherein the manifold and the housing are spaced apart defining one or more pockets, wherein a nozzle assembly extends from the manifold via the pocket through a bore of the housing, the nozzle assembly comprises a nozzle heater located in the bore, wherein a sensor is located in the bore in which the nozzle heater extends to detect leaking plastic pressed through the bore; and wherein the sensor is a mesh around the nozzle assembly changing electrical or mechanical or optical behavior upon contact with molten plastic.

21. An injection molding hot runner system adapted for leak detection during injection molding, wherein the hot runner system comprises a manifold and a housing surrounding the manifold, wherein the manifold and the housing are spaced apart defining one or more pockets, wherein a nozzle assembly extends from the manifold via the pocket through a bore of the housing, the nozzle assembly comprises a nozzle heater located in the bore, wherein a sensor is located in the bore in which the nozzle heater extends to detect leaking plastic pressed through the bore; and wherein the sensor is an optical sensor comprising a fibre optic having grooves, which when covered by molten plastic interrupt or reduce light passing through the fibre optic.

\* \* \* \* \*